United States Patent
Kataoka

(10) Patent No.: US 10,392,051 B2
(45) Date of Patent: Aug. 27, 2019

(54) VEHICLE DRIVING ASSIST APPARATUS

(71) Applicant: TOYOTA JIDOSHA KABUSHIKI KAISHA, Toyota-shi, Aichi (JP)

(72) Inventor: Hiroaki Kataoka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 112 days.

(21) Appl. No.: 15/677,269

(22) Filed: Aug. 15, 2017

(65) Prior Publication Data
US 2018/0148092 A1 May 31, 2018

(30) Foreign Application Priority Data
Nov. 25, 2016 (JP) .................. 2016-228614

(51) Int. Cl.
| | | |
|---|---|---|
| B62D 15/02 | (2006.01) | |
| G06K 9/00 | (2006.01) | |
| G06T 7/13 | (2017.01) | |

(52) U.S. Cl.
CPC ....... B62D 15/025 (2013.01); G06K 9/00798 (2013.01); G06T 7/13 (2017.01); *G06T 2207/10016* (2013.01); *G06T 2207/30256* (2013.01)

(58) Field of Classification Search
CPC ............. B60T 2201/08; B60T 8/17557; B60T 2201/083; B60T 2201/081; B60T 2201/086; B60T 2201/087; B60T 2201/089; B60W 30/12; B60W 10/18; B60W 10/20; B60W 2420/42; B60W 10/184; B60W 2550/142; B60W 2550/143; B60W 2710/18; B60W 50/10; G08G 1/167; B62D 15/025; G06K 9/00798

USPC ..... 701/1, 36, 41, 70, 300, 301; 348/46; 1/1
See application file for complete search history.

(56) References Cited

U.S. PATENT DOCUMENTS

| | | | | |
|---|---|---|---|---|
| 2004/0230375 | A1* | 11/2004 | Matsumoto | ......... B60T 8/17557 701/301 |
| 2005/0096827 | A1* | 5/2005 | Sadano | ..................... B60T 7/22 701/70 |
| 2005/0107939 | A1* | 5/2005 | Sadano | ............... B60T 8/17557 701/70 |
| 2005/0125153 | A1* | 6/2005 | Matsumoto | ......... B60T 8/17557 701/300 |

(Continued)

FOREIGN PATENT DOCUMENTS

WO 2011/064825 A1 6/2011

*Primary Examiner* — Anshul Sood
(74) *Attorney, Agent, or Firm* — Oliff PLC

(57) ABSTRACT

A vehicle driving assist apparatus of the invention executes an interpolation estimation process for estimating a road end line when the road end line becomes unable to be acquired and executes a road end line departure prevention control to prevent a vehicle from departing from the estimated road end line. The apparatus stops the interpolation estimation process and the road end line departure prevention control when a predetermined time elapses. When a last road end line extends toward an own vehicle traveling lane, the apparatus sets the predetermined time such that the predetermined time set when a road end line angle defined between extending directions of the last road end line and the own vehicle traveling lane is large, is smaller than the predetermined time set when the road end line angle is small.

5 Claims, 12 Drawing Sheets

(56) References Cited

U.S. PATENT DOCUMENTS

| | | | |
|---|---|---|---|
| 2006/0149448 A1* | 7/2006 | Tange | B60T 8/17557 701/41 |
| 2008/0172153 A1* | 7/2008 | Ozaki | B60T 8/17557 701/36 |
| 2009/0030613 A1* | 1/2009 | Kataoka | G06K 9/00798 701/300 |
| 2011/0246040 A1* | 10/2011 | Nakayama | B60T 8/17557 701/70 |
| 2012/0140039 A1* | 6/2012 | Ota | B60W 30/12 348/46 |
| 2012/0215377 A1* | 8/2012 | Takemura | B60W 30/12 701/1 |
| 2012/0226392 A1* | 9/2012 | Kataoka | G08G 1/167 701/1 |
| 2015/0375784 A1* | 12/2015 | Ogawa | B62D 15/025 701/41 |
| 2016/0003628 A1* | 1/2016 | Osanai | G06K 9/00798 701/532 |
| 2016/0012298 A1* | 1/2016 | Maeda | G06K 9/00798 382/104 |
| 2016/0046290 A1* | 2/2016 | Aharony | G06K 9/00798 701/41 |
| 2016/0152237 A1* | 6/2016 | Takahashi | B60W 30/02 701/41 |
| 2017/0357861 A1* | 12/2017 | Okuda | G06K 9/00798 |
| 2018/0037215 A1* | 2/2018 | Otake | B60W 40/10 |
| 2018/0129854 A1* | 5/2018 | Jeon | G06K 9/00798 |

\* cited by examiner

VEHICLE DRIVING ASSIST APPARATUS

BACKGROUND OF THE INVENTION

Field of the Invention

The invention relates to a vehicle driving assist apparatus for controlling a traveling direction of a vehicle to prevent the vehicle from departing from an end line of a road.

Description of the Related Art

There is known a vehicle driving assist apparatus configured to alert a driver of a vehicle when the vehicle nearly departs to an outside of a road from a road end line such as a line defined by a curb installed next to the road on which the vehicle travels and a boundary line between grass and the road (for example, see WO 2011/064825).

Further, there is known a vehicle driving assist apparatus configured to execute a road end line departure prevention control for applying a steering torque to a steering column of the vehicle, thereby changing a traveling direction of the vehicle to prevent the vehicle from departing from the road end line when the vehicle nearly departs from the road end line to the outside of the road. Hereinafter, this vehicle driving assist apparatus will be referred to as "the conventional apparatus".

When the conventional apparatus cannot detect the road end line, the conventional apparatus cannot determine whether the vehicle departs from the road end line.

In this case, if the conventional apparatus is configured to estimate a line extended forward from the road end line detected before the conventional apparatus becomes unable to detect the road end line as an estimated road end line which has not been detected by the conventional apparatus, the conventional apparatus can determine whether the vehicle departs from the road end line on the basis of the estimated road end line.

In this regard, an extending direction of the road end line may change from a direction extending parallel to an own vehicle traveling lane corresponding to a lane in which the vehicle travels, to a direction extending toward the own vehicle traveling lane. When the road end line to be detected, extends toward the own vehicle traveling lane, the conventional apparatus may become unable to detect the road end line. When the conventional apparatus becomes unable to detect the road end line and then, estimates the road end line which cannot be detected as described above, the estimated road end line extends across the own vehicle traveling lane.

If the conventional apparatus determines whether the road end line departure prevention control should be executed on the basis of a determination of whether the vehicle departs from the road end line on the basis of the road end line extending across the own vehicle traveling lane, the conventional apparatus may execute the road end line departure prevention control to change the traveling direction of the vehicle though the vehicle does not depart from the actual road end line.

The invention has been made for solving the above-mentioned problems. An object of the invention is to provide a vehicle driving assist apparatus configured to estimate the road end line which cannot be detected on the basis of the road end line which has been detected before the road end line becomes unable to be detected, thereby executing the road end line departure prevention control without executing the road end line departure prevention control unnecessarily.

SUMMARY OF THE INVENTION

The vehicle driving assist apparatus according to the invention comprises a camera device (51) and an electric control unit (10, 20). The camera device (51) is mounted on a vehicle (100). The camera device (51) takes an image of a landscape ahead of the vehicle (100) and acquires image data corresponding to data of the taken image. The electric control unit (10, 20) controls a traveling direction of the vehicle (100).

The electric control unit (10, 20) acquires a road end line (LEout, LEin) corresponding to a boundary between a road (RD) on which the vehicle (100) travels and an area (AR) outside of the road (RD), using the image data of the landscape taken by the camera device (51) (see a process of a step 720 in FIG. 7). When the electric control unit (10, 20) can acquire the road end line (LEout, LEin) (see determinations "Yes" at steps 805 and 905 in FIGS. 8 and 9), the electric control unit (10, 20) executes a road end line departure prevention control for controlling the traveling direction of the vehicle (100) to prevent the vehicle (100) from departing from the acquired road end line (LEout, LEin) (see processes of steps 1025 and 1045 in FIG. 10).

On the other hand, when the electric control unit (10, 20) cannot acquire the road end line (LEout, LEin) (see determinations "No" at the steps 805 and 905), the electric control unit (10, 20) is configured to execute an interpolation estimation process for estimating the road end line (LEout, LEin) as an estimated road end line (LEout_est, LEin_est) on the basis of a last road end line (LEout_last, LEin_last) corresponding to the road end line (LEout, LEin) acquired immediately before the electric control unit (10, 20) becomes unable to acquire the road end line (LEout, LEin) (see processes of steps 835 and 935 in FIGS. 8 and 9). In this case, the electric control unit (10, 20) executes the road end line departure prevention control to prevent the vehicle (100) from departing from the estimated road end line (LEout_est, LEin_est) (see the processes of the steps 1025 and 1045).

Further, the electric control unit (10, 20) stops executions of the interpolation estimation process and the road end line departure prevention control (see processes of steps 845 and 945 in FIGS. 8 and 9) when a predetermined time (Tth) elapses after the electric control unit (10, 20) becomes unable to acquire the road end line (LEout, LEin) (see determinations "No" at steps 830 and 930 in FIGS. 8 and 9).

Furthermore, when the last road end line (LEout_last, LEin_last) extends toward an own vehicle traveling lane (LN) in which the vehicle (100) travels, the electric control unit (10, 20) acquires a road end line angle (θout, θin) defined between an extending direction of the last road end line (LEout_last, LEin_last) and an extending direction of the own vehicle traveling lane (LN). Then, the electric control unit (10, 20) sets the predetermined time (Tth) such that the predetermined time (Tth) set when the road end line angle (θout, θin) is large, is smaller than the predetermined time (Tth) set when the road end line angle (θout, θin) is small (see processes of steps 820, 825, 920 and 925 in FIGS. 8 and 9).

In particular, the electric control unit (10, 20) may be configured to set the predetermined time (Tth) (see processes of steps 840 and 940 and the processes of the steps 845 and 945 in FIGS. 8 and 9) such that the predetermined time (Tth) set when the road end line angle (θout, θin) is larger than or equal to a predetermined angle (θth) (see determinations "Yes" at steps 815 and 915 in FIGS. 8 and 9), is smaller than the predetermined time (Tth) set when the road end line angle (θout, θin) is smaller than the predetermined angle (θth) (see determinations "No" at the steps 815 and 915).

Further, the electric control unit (10, 20) may be configured to execute the interpolation estimation process for acquiring a straight extension line of the last road end line (LEout_last, LEin_last) as the estimated road end line (LEout, LEin) when the last road end line (LEout_last, LEin_last) is straight. In addition, the electric control unit (10, 20) may be configured to execute the interpolation estimation process for acquiring a curved extension line the last road end line (LEout_last, LEin_last) with a curvature radius (Rout, Rin) of the last road end line (LEout_last, LEin_last) as the estimated road end line (LEout, LEin) when the last road end line (LEout_last, LEin_last) is curved.

As described above, the extending direction of the road end line may change from the direction extending parallel to the own vehicle traveling lane to the direction extending toward the own vehicle traveling lane. When the road end line extending toward the own vehicle traveling lane becomes unable to be acquired and then, the interpolation estimation process for estimating the non-acquired road end line as the estimated road end line is executed, the estimated road end line extends across the own vehicle traveling lane.

When a determination process of whether the vehicle departs from the road end line is executed on the basis of the estimated road end line extending across the own vehicle traveling lane, the vehicle approaches the estimated road end line even though the vehicle travels in the own vehicle traveling lane. In this case, although the vehicle does not depart from the actual road end line, the road end line departure prevention control may be executed to change the traveling direction of the vehicle.

With the vehicle driving assist apparatus according to the invention, when the last acquired road end line extends toward the own vehicle traveling lane, the predetermined time corresponding to a duration time of the execution of the interpolation estimation process is shortened. Thereby, the executions of the interpolation estimation process and the road end line departure prevention control are stopped early after the road end line becomes unable to be acquired. Thus, the road end line departure prevention control is unlikely to be executed unnecessarily.

According to an aspect of the invention, the electric control unit (10, 20) may be configured to set the predetermined time (Tth) to a time larger than zero (see processes of steps 825 and 925 in FIGS. 8 and 9) when the road end line angle (θout, θin) is smaller than the predetermined angle (θth) (see determinations "No" at steps 1115 and 1215). On the other hand, the electric control unit (10, 20) may be configured to set the predetermined time (Tth) to zero (see processes of steps 1120 and 1220) when the road end line angle (θout, θin) is larger than or equal to the predetermined angle (θth) (see determinations "Yes" at the steps 1115 and 1215).

With the vehicle driving assist apparatus according to this aspect, the interpolation estimation process is not executed when the last road end line extends toward the own vehicle traveling lane at an angle larger than or equal to the predetermined angle. Thus, a possibility that the road end line departure prevention control is executed unnecessarily, is further decreased.

According to another aspect of the invention, the electric control unit (10, 20) may be configured to set the predetermined time (Tth) such that the predetermined time (Tth) set when a traveling speed (V) of the vehicle (100) is large, is smaller than the predetermined time (Tth) set when the traveling speed (V) of the vehicle (100) is small (see the processes of the steps 820, 825, 920 and 925). When the interpolation estimation process and the road end line departure prevention control are executed for a long time while the traveling speed of the vehicle is large, the road end line departure prevention control is likely to be executed unnecessarily. With the vehicle driving assist apparatus according to this aspect, it is ensured that the unnecessary execution of the road end line departure prevention control is prevented.

In the above description, for facilitating understanding of the present invention, elements of the present invention corresponding to elements of an embodiment described later are denoted by reference symbols used in the description of the embodiment accompanied with parentheses. However, the elements of the present invention are not limited to the elements of the embodiment defined by the reference symbols. The other objects, features and accompanied advantages of the present invention can be easily understood from the description of the embodiment of the present invention along with the drawings.

DESCRIPTION OF THE PREFERRED EMBODIMENTS

Figure 1:
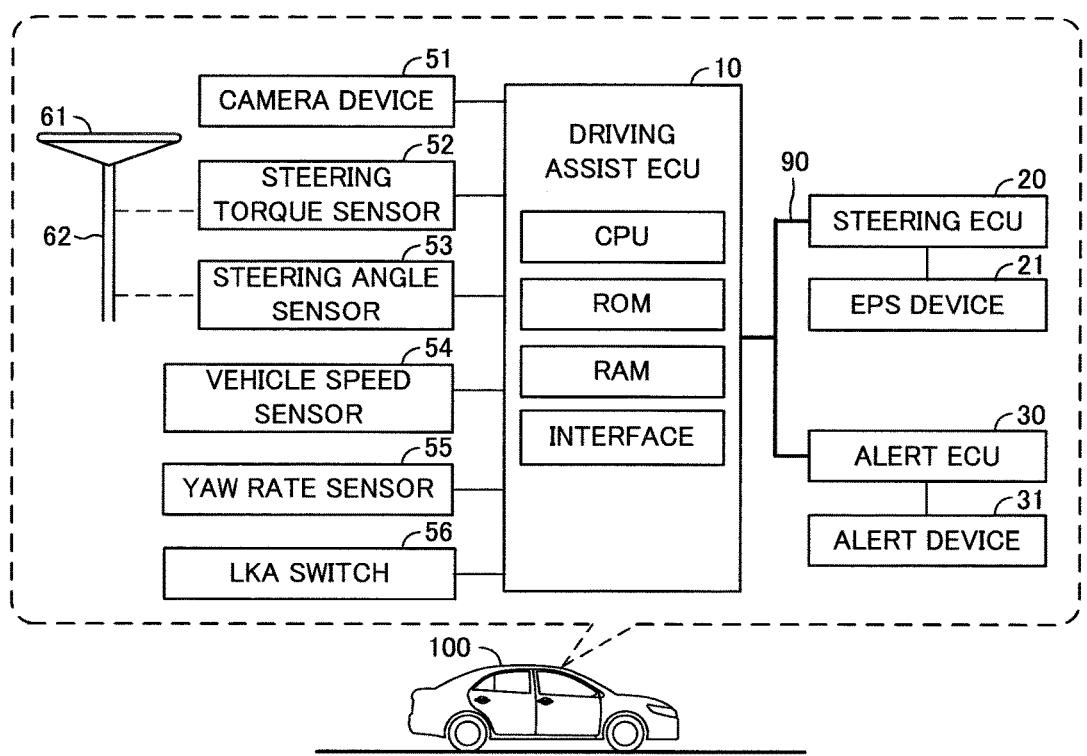
FIG. 1 is a view for showing a vehicle driving assist apparatus according to an embodiment of the invention.

Below, a vehicle driving assist apparatus according to an embodiment of the invention will be described with reference to the drawings. Hereinafter, the vehicle driving assist apparatus according to the embodiment will be referred to as "the embodiment apparatus". The embodiment apparatus is applied to a vehicle 100 shown in FIGS. 1 and 2. As shown in FIG. 1, the embodiment apparatus includes a driving assist ECU 10, a steering ECU 20 and an alert ECU 30.

The ECU is an electric control unit. Each of the ECUs 10, 20 and 30 is an electronic control circuit including as a main component, a micro-computer including a CPU, a ROM, a RAM, an interface and the like. The CPU realizes various functions described later by executing instructions or routines stored in a memory such as the ROM. Some or all of the ECUs 10, 20 and 30 may be integrated into one ECU.

The driving assist ECU 10, the steering ECU 20 and the alert ECU 30 are electrically connected to each other via a communication/sensor CAN (i.e., Controller Area Network) 90 such that the ECUs 10, 20 and 30 can communicate with each other, in other words, send and receive data to and from each other.

The driving assist ECU 10 is electrically connected to a camera device 51, a steering torque sensor 52, a steering angle sensor 53, a vehicle speed sensor 54, a yaw rate sensor 55 and an LKA switch 56.

Figure 2:
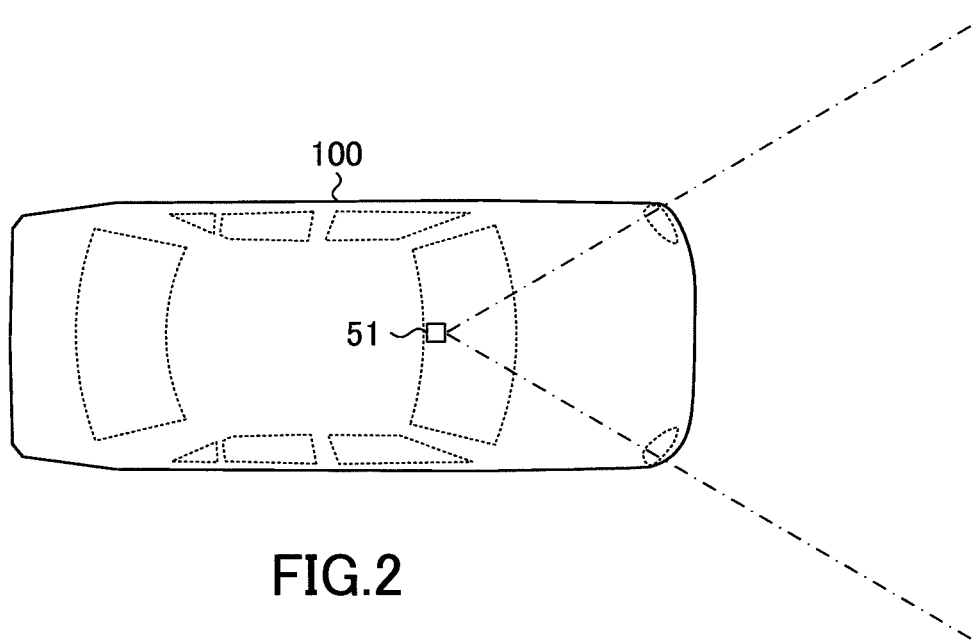
FIG. 2 is a view for showing a vehicle shown in FIG. 1.

The camera device 51 includes, for example, a CCD camera. As shown in FIG. 2, the camera device 51 is secured to a stay of an inner rear viewer (so-called room mirror) or the like of a front part of a vehicle body of the vehicle 100.

While the camera device 51 is secured to the vehicle body, the camera device 51 has an optical axis having a predetermined depression angle and aligns with a vehicle traveling direction corresponding to a longitudinal direction of the vehicle body. Thereby, the camera device 51 can take an image of a landscape including a surface of a road on which the vehicle 100 travels, ahead of the vehicle 100 in the vehicle traveling direction.

In particular, the camera device 51 can take the image of the landscape in a range from a first position away from the vehicle 100 by a predetermined distance to a second position remote from the first position ahead of the vehicle 100. The camera device 51 sends image data corresponding to data of the taken image to the driving assist ECU 10.

Figure 3A:
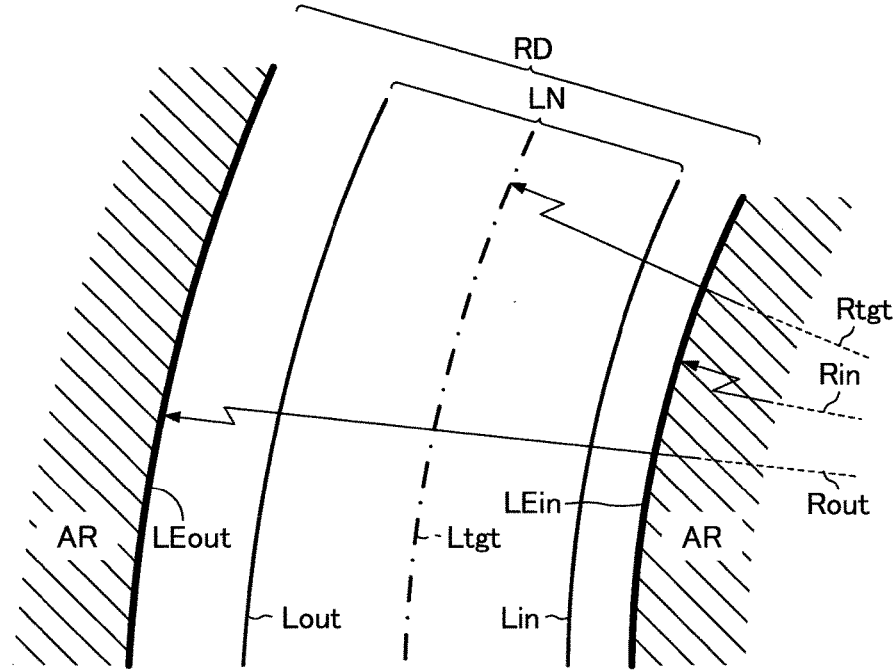
FIG. 3A is a view for showing a road end line and the like when a road curves.
Figure 3B:
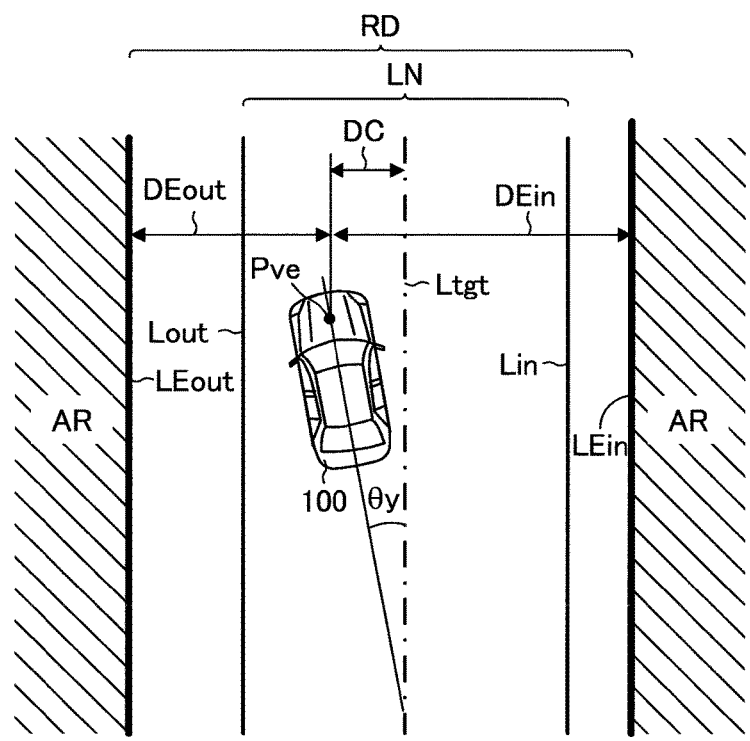
FIG. 3B is a view for showing the road end line and the like when the road extends straight.

The driving assist ECU 10 processes the image data received from the camera device 51 to acquire processed image data. As shown in FIGS. 3A and 3B, the driving assist ECU 10 acquires outer and inner lane markings Lout and Lin drawn on an own vehicle traveling road corresponding to a road RD on which the vehicle 100 travels, on the basis of the processed image data.

In this embodiment, the outer lane marking Lout is a lane marking drawn at a left side of the own vehicle traveling road RD in the traveling direction of the vehicle 100. The inner lane marking Lin is a lane marking drawn at a right side of the own vehicle traveling road RD in the traveling direction of the vehicle 100. Each of the outer and inner lane markings Lout and Lin is a line such as a white solid line or a white chained line or a yellow solid line or a yellow chained line or a combination thereof drawn along the own vehicle traveling road RD.

The driving assist ECU 10 acquires road end lines LEout and LEin, each of which separates the own vehicle traveling road RD from an area AR outside of the own vehicle traveling road RD, using the processed image data. Hereinafter, the road end line LEout located at the left side or an outer side of the own vehicle traveling road RD in the traveling direction of the vehicle 100 will be referred to as "the outer end line LEout" and the road end line LEin located at the right side or an inner side of the own vehicle traveling road RD in the traveling direction of the vehicle 100 will be referred to as "the inner end line LEin". In this embodiment, the outer and inner end lines LEout and LEin include road end lines described below, respectively.

(1) A curb which separates the own vehicle traveling road RD from a curbside on which a person walks.

(2) A boundary line between the own vehicle traveling road RD and grass next to the own vehicle traveling road RD.

(3) A boundary line between the own vehicle traveling road RD and the ground next to the own vehicle traveling road RD.

(4) A wall installed next to the own vehicle traveling road RD.

(5) A guard rail installed next to the own vehicle traveling road RD.

(6) An oncoming vehicle corresponding to a vehicle traveling in a lane next to a lane LN on which the vehicle 100 travels, in a direction opposite to the traveling direction of the vehicle 100. Hereinafter, the lane LN in which the vehicle 100 travels, will be referred to as "the own vehicle traveling lane LN".

(7) A medial strip which separates the own vehicle traveling lane LN from the lane in which the oncoming vehicle travels.

(8) A next lane vehicle corresponding to a vehicle traveling or stopped in a lane next to the own vehicle traveling lane LN, in the same direction as the traveling direction of the vehicle 100.

(9) A stopped vehicle corresponding to a vehicle which stops adjacent to the own vehicle traveling lane LN.

In this embodiment, as shown in FIGS. 3A and 3B, the own vehicle traveling lane LN is an area between the outer and inner lane markings Lout and Lin. The own vehicle traveling road RD is an area between the outer and inner end lines LEout and LEin.

As shown in FIG. 1, the steering torque sensor 52 detects a driver steering torque corresponding to a steering torque TQdr input to a steering wheel 61 by a driver of the vehicle 100 and sends a signal indicating the driver steering torque TQdr to the driving assist ECU 10. The driving assist ECU 10 acquires the driver steering torque TQdr on the basis of the signal received from the steering torque sensor 52.

The steering angle sensor 53 detects a steering angle corresponding to a rotation angle θsw of the steering wheel 61 with respect to a base position corresponding to a rotation angle of the steering wheel 61 for causing the vehicle 100 to travel straight and sends a signal indicating the steering angle θsw to the driving assist ECU 10. The driving assist ECU 10 acquires the steering angle θsw on the basis of the signal received from the steering angle sensor 53.

The vehicle speed sensor 54 detects a vehicle speed corresponding to a traveling speed V of the vehicle 100 and sends a signal indicating the vehicle speed V to the driving assist ECU 10. The driving assist ECU 10 acquires the vehicle speed V on the basis of the signal received from the vehicle speed sensor 54.

The yaw rate sensor 55 detects a yaw rate corresponding to an angular velocity γ of the vehicle 100 and sends a signal indicating the yaw rate γ to the driving assist ECU 10. The driving assist ECU 10 acquires the yaw rate γ on the basis of the signal received from the yaw rate sensor 55.

The LKA switch 56 is configured to be operated by the driver. When the LKA switch 56 is set at an ON position by the driver, the LKA switch 56 sends an LKA ON signal indicating that the LKA switch 56 is set at the ON position, to the driving assist ECU 10. On the other hand, when the LKA switch 56 is set at an OFF position by the driver, the LKA switch 56 sends an LKA OFF signal indicating that the LKA switch 56 is set at the OFF position, to the driving assist ECU 10.

When the driving assist ECU 10 receives the LKA ON signal, the driving assist ECU 10 is permitted to execute a lane keeping control for controlling the traveling direction of the vehicle 100 such that the vehicle 100 travels along a center of the own vehicle traveling lane LN. On the other hand, when the driving assist ECU 10 receives the LKA OFF signal, the driving assist ECU 10 is prohibited to execute the lane keeping control. Hereinafter, the lane keeping control will be referred to as "the LKA control".

An electric-powered steering device 21 is a known device. The electric-powered steering device 21 is configured to apply a steering torque TQ to a steering column 62. The electric-powered steering device 21 is electrically connected to the steering ECU 20. Hereinafter, the electric-powered steering device 21 will be referred to as "the EPS device 21".

The steering ECU 20 calculates or acquires a target assist steering torque TQtgt corresponding to the steering torque TQ to be applied to the steering column 62 to assist a steering operation of the driver on the basis of the driver steering torque TQdr. The steering ECU 20 controls an activation of the EPS device 21 such that the steering torque TQ corresponding to the steering torque TQtgt is applied to the steering column 62.

In addition, when the steering ECU 20 receives from the driving assist ECU 10, an LKA command signal for commanding the steering ECU 20 to apply an LKA torque TQ_LKA calculated as described later to the steering column 62, the steering ECU 20 controls the activation of the EPS device 21 to apply the steering torque TQ corresponding to the LKA torque TQ_LKA to the steering column 62 without applying the steering torque TQ corresponding to the target assist steering torque TQtgt to the steering column 62.

On the other hand, when the steering ECU 20 receives from the driving assist ECU 10, an LDA command signal for commanding the steering ECU 20 to apply the steering torque TQ corresponding to an LDA steering torque TQ_LDAout or TQ_LDAin calculated as described later to the steering column 62, the steering ECU 20 controls the activation of the EPS device 21 to apply the steering torque TQ corresponding to the LDA steering torque TQ_LDAout or TQ_LDAin to the steering column 62 without applying the steering torque TQ corresponding to the target assist steering torque TQtgt to the steering column 62.

An alert device 31 is a known device and provided in an interior of the vehicle 100. The alert device 31 includes an alert lamp and/or an alert sound generation device such as a buzzer provided on an instrument panel. The alert device 31 is configured to provide a passenger or passengers of the vehicle 100, in particular, the driver with alert information for informing the driver that the vehicle 100 departs or nearly departs from the own vehicle traveling road RD beyond the road end line LEout or LEin. The alert device 31 is electrically connected to the alert ECU 30.

When the alert ECU 30 receives from the driving assist ECU 10, an alert command signal for commanding the alert ECU 30 to provide the passenger(s), in particular, the driver with the alert information, the alert ECU 30 controls an activation of the alert device 31 to provide the passenger(s) with the alert information.

<Summary of Operation of Embodiment Apparatus>

Below, a summary of an operation of the embodiment apparatus will be described. The embodiment apparatus is configured to execute one of the LKA control for controlling the traveling direction of the vehicle 100 to cause the vehicle 100 to travel at the center of the own vehicle traveling lane LN and a road end line departure prevention control for controlling the traveling direction of the vehicle 100 to prevent the vehicle 100 from departing from the own vehicle traveling road RD beyond the road end line LEout or LEin. Below, the LKA control and the road end line departure prevention control will be described. Hereinafter, the road end line departure prevention control will be referred to as "the LDA control".

As shown in FIGS. 3A and 3B, the embodiment apparatus sets a line passing through a center position between the outer and inner lane markings Lout and Lin as a target moving line Ltgt. In addition, the embodiment apparatus acquires a radius of a curve drawn by the target traveling line Ltgt as a target curvature radius Rtgt. In this embodiment, when the target traveling line Ltgt is straight, the embodiment apparatus acquires an infinite value as the target curvature radius Rtgt.

Further, as shown in FIG. 3B, the embodiment apparatus acquires a traveling line distance corresponding to a distance DC between a base point Pve of the vehicle 100 and the target traveling line Ltgt in a width direction of the own vehicle traveling road RD. In addition, the embodiment apparatus acquires a yaw angle corresponding to a misalignment angle θy defined between an extending direction of the target traveling line Ltgt and an orientation direction of the vehicle 100. In this embodiment, the base point Pve of the vehicle 100 is a point located on a shaft connecting the right and left front wheels of the vehicle 100 to each other and a center of the shaft in the width direction of the vehicle 100. Hereinafter, the base point Pve will be referred to as "the vehicle base point Pve".

Furthermore, the embodiment apparatus acquires an outer end distance corresponding to a distance DEout between the vehicle base point Pve and the outer end line LEout in the width direction of the own vehicle traveling road RD. In addition, the embodiment apparatus acquires an inner end distance corresponding to a distance DEin between the vehicle base point Pve and the inner end line LEin in the width direction of the own vehicle traveling road RD.

Further, the embodiment apparatus acquires an outer end distance correlation value DEout_sk by subtracting the outer end line distance DEout from a base distance DEref (i.e., DEout_sk=DEref−DEout) and an inner end distance correlation value DEin_sk by subtracting the inner end line distance DEin from the base distance DEref (i.e., DEin_sk=DEref−DEin).

When the LKA switch 56 is set at the ON position, the embodiment apparatus applies the vehicle speed V, the target curvature radius Rtgt, the traveling line distance DC and the yaw angle θy to an expression (1) described below to acquire the LKA torque TQ_LKA to be applied from the EPS device 21 to the steering column 62 by the LKA control.

$$TQ\_LKA = K1\_LKA \cdot (V^2/Rtgt) + K2\_LKA \cdot DC + K3\_LKA \cdot \theta y \qquad (1)$$

In the expression (1), each of parameters "K1_LKA", "K2_LKA" and "K3_LKA" is a control gain and may be a constant value or a value which increases as the vehicle speed V increases. It should be noted that when the LKA switch 56 is set at the OFF position, the embodiment apparatus sets the LKA torque TQ_LKA to zero.

Further, a first term of a right-hand side of the expression (1) is a feedforward torque component determined, depending on the target curvature radius Rtgt and the vehicle speed V. A second term of the right-hand side of the expression (1) is a feedback torque component for decreasing the traveling line distance DC which is a positional misalignment of the vehicle 100 with respect to the target traveling line Ltgt in the width direction of the own vehicle traveling road RD. A third term of the right-hand side of the expression (1) is a feedback torque component for decreasing the yaw angle θy.

Independently of a set position of the LKA switch 56, when the outer end line distance DEout becomes smaller than or equal to a predetermined distance DEth and the embodiment apparatus is permitted to execute an outer end line LDA control for preventing the vehicle 100 from departing from the own vehicle traveling road RD beyond the outer end line LEout, the embodiment apparatus applies the vehicle speed V, the target curvature radius Rtgt, the outer end line distance correlation value DEout_sk, the yaw angle θy, the yaw rate γ and a target yaw rate γtgt to an expression (2) described below to acquire the LDA torque TQ_LDAout to be applied from the EPS device 21 to the steering column 62, thereby preventing the vehicle 100 from departing from the own vehicle traveling road RD beyond the outer end line LEout. Hereinafter, the steering torque TQ_LDAout will be referred to as "the outer end line LDA torque TQ_LDAout".

$$TQ\_LDAout = K1\_LDAout \cdot (V^2/Rtgt) + K2\_LDAout \cdot DEout\_sk + K3\_LDAout \cdot \theta y + K4\_LDAout \cdot (\gamma tgt - \gamma) \qquad (2)$$

In the expression (2), each of parameters K1_LDAout to K4_LDAout is a control gain and is set to a value which increases as the vehicle speed V increases. The control gains K1_LDAout to K3_LDAout are set to values larger than the control gains K1_LKA to K3_LKA used for calculating the LKA torque TQ_LKA, respectively.

Further, a first term of a right-hand side of the expression (2) is a feedforward torque component determined, depending on the target curvature radius Rtgt and the vehicle speed V. A second term of the right-hand side of the expression (2) is a feedback torque component for restraining the vehicle 100 from approaching the outer end line LEout in the width direction of the own vehicle traveling road RD. A third term of the right-hand side of the expression (2) is a feedback torque component for decreasing the yaw angle θy. The target yaw rate γtgt is set to a value based on a sum of the first to third terms of the right-hand side of the expression (2). A fourth term of the right-hand side of the expression (2) is a feedback torque component for decreasing a difference between the target yaw rate γtgt and the yaw rate γ. In this regard, a value acquired by multiplying a difference between a target lateral acceleration Gytgt and a lateral acceleration Gy of the vehicle 100 detected by a lateral acceleration sensor (not shown) for detecting the lateral acceleration Gy of the vehicle 100, by a control gain may be used as the fourth term of the right-hand side of the expression (2). Otherwise, the fourth term of the right-hand side of the expression (2) may be omitted.

Then, the embodiment apparatus compares the LKA torque TQ_LKA with the outer end line LDA torque TQ_LDAout. When the outer end line LDA torque TQ_LDAout is larger than the LKA torque TQ_LKA, the embodiment apparatus executes the outer end line LDA control. In this case, the embodiment apparatus causes the EPS device 21 to apply the steering torque TQ corresponding to the outer end line LDA torque TQ_LDAout to the steering column 62.

On the other hand, independently of a set position of the LKA switch 56, when the inner end line distance DEin becomes smaller than or equal to the predetermined distance DEth and the embodiment apparatus is permitted to execute an inner end line LDA control for preventing the vehicle 100 from departing from the own vehicle traveling road RD beyond the inner end line LEin, the embodiment apparatus applies the vehicle speed V, the target curvature radius Rtgt, the inner end line distance correlation value DEin_sk, the yaw angle θy, the yaw rate γ and the target yaw rate γtgt to an expression (3) described below to acquire the LDA torque TQ_LDAin to be applied from the EPS device 21 to the steering column 62, thereby preventing the vehicle 100 from departing from the own vehicle traveling road RD beyond the inner end line LEin. Hereinafter, the LDA torque TQ_LDAin will be referred to as "the inner end line LDA torque TQ_LDAin".

$$TQ\_LDAin = K1\_LDAin \cdot (V^2/Rtgt) + K2\_LDAin \cdot DEin\_sk + K3\_LDAin \cdot \theta y + K4\_LDAin \cdot (\gamma tgt - \gamma) \qquad (3)$$

In the expression (3), each of parameters K1_LDAin to K4_LDAin is a control gain and is set to a value which increases as the vehicle speed V increases. It should be noted that the control gains K1_LDAin to K3_LDAin are set to values larger than the control gains K1_LKA to K3_LKA used for calculating the LKA torque TQ_LKA, respectively.

Further, a first term of a right-hand side of the expression (3) is a feedforward torque component determined, depending on the target curvature radius Rtgt and the vehicle speed V. A second term of the right-hand side of the expression (3) is a feedback torque component for restraining the vehicle 100 from approaching the inner end line LEin in the width direction of the own vehicle traveling road RD. A third term of the right-hand side of the expression (3) is a feedback torque component for decreasing the yaw angle θy. The target yaw rate γtgt is set to a value based on a sum of the first to third terms of the right-hand side of the expression (3). A fourth term of the right-hand side of the expression (3) is a feedback torque component for decreasing a difference between the target yaw rate γtgt and the yaw rate γ. In this regard, a value acquired by multiplying the difference between the target lateral acceleration Gytgt and the lateral acceleration Gy of the vehicle 100 by a control gain may be used as the fourth term of the right-hand side of the expression (3). Otherwise, the fourth term of the right-hand side of the expression (3) may be omitted.

Then, the embodiment apparatus compares the LKA torque TQ_LKA with the inner end line LDA torque TQ_LDAin. When the inner end line LDA torque TQ_LDAin is larger than the LKA torque TQ_LKA, the embodiment apparatus executes the inner end line LDA control. In this case, the embodiment apparatus causes the EPS device 21 to apply the steering torque TQ corresponding to the inner end line LDA torque TQ_LDAin to the steering column 62.

On the other hand, when the LKA torque TQ_LKA is larger than or equal to the outer and inner end line LDA torques TQ_LDAout and TQ_LDAin, the embodiment apparatus executes the LKA control. In this case, the embodiment apparatus causes the EPS device 21 to apply the steering torque TQ corresponding to the LKA torque TQ_LKA to the steering column 62.

In this embodiment, the predetermined distance DEth is set to a value capable of controlling the traveling direction of the vehicle 100 to prevent the vehicle 100 from departing from the outer or inner end line LEout or LEin by applying the steering torque TQ smaller than or equal to an upper limit of the steering torque TQ capable of changing the traveling direction of the vehicle 100 safely when the embodiment apparatus starts an execution of the outer or inner end line LDA control in response to the outer or inner end line distance DEout or DEin decreasing to the predetermined distance DEth.

Further, the predetermined distance DEth is set a value which increases as the vehicle speed V increases. In addition, the predetermined distance DEth is set a value which increases as the yaw angle θy increases.

<Interpolation Estimation>

Figure 4A:
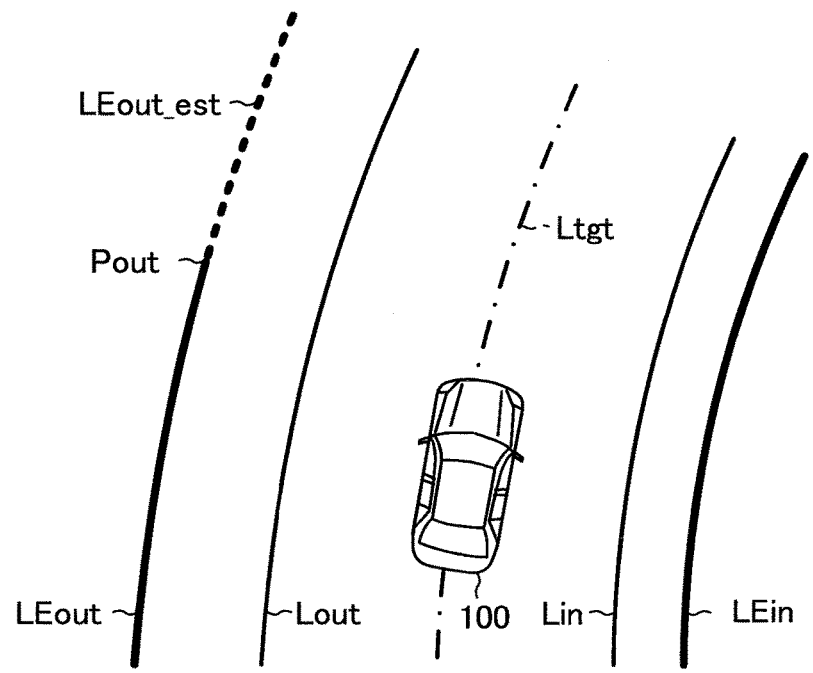
FIG. 4A is a view used for describing an interpolation estimation process for estimating the road end line when the road curves.

The embodiment apparatus may become unable to acquire the outer end line LEout. As shown in FIG. 4A, when the embodiment apparatus becomes unable to acquire the curved outer end line LEout at a position Pout, the embodiment apparatus acquires a curvature radius Rout of the outer end line LEout acquired immediately before the position Pout, using the processed image data. Hereinafter, the outer end line LEout acquired immediately before the position Pout will be referred to as "the last outer end line LEout_last" and the curvature radius Rout of the outer end line LEout will be referred to as "the outer end line curvature radius Rout".

The embodiment apparatus executes an interpolation estimation process for acquiring an estimated outer end line LEout_est corresponding to a curved line acquired by extending the last outer end line LEout_last from the position Pout with the outer curvature radius Rout of the last outer end line LEout_last. The embodiment apparatus executes the interpolation estimation process for a predetermined time Tth.

Figure 4B:
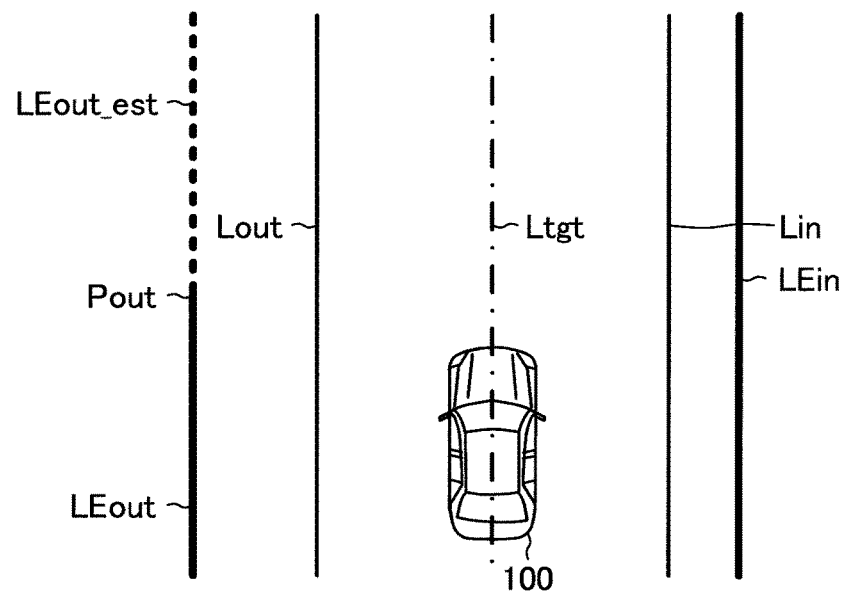
FIG. 4B is a view used for describing the interpolation estimation process for estimating the road end line when the road extends straight.

On the other hand, as shown in FIG. 4B, when the embodiment apparatus becomes unable to acquire the straight outer end line LEout at the position Pout, the embodiment apparatus executes the interpolation estimation process for acquiring the estimated outer end line LEout_est corresponding to a straight line acquired by extending the last outer end line LEout_last straight from the position Pout. The embodiment apparatus executes the interpolation estimation process for the predetermined time Tth.

The embodiment apparatus may become unable to acquire the inner end line LEin. When the embodiment apparatus becomes unable to acquire the curved outer end line LEin at a position Pin, the embodiment apparatus acquires a curvature radius Rin of the inner end line LEin acquired immediately before the position Pin, using the processed image data. Hereinafter, the inner end line LEin acquired immediately before the position Pin will be referred to as "the last inner end line LEin_last" and the curvature radius Rin of the inner end line LEin will be referred to as "the inner end line curvature radius Rin".

The embodiment apparatus executes the interpolation estimation process for acquiring an estimated inner end line LEin_est corresponding to a curved line acquired by extending the last inner end line LEin_last from the position Pin with the inner end line curvature radius Rin of the last inner end line LEin_last. The embodiment apparatus executes the interpolation estimation process for the predetermined time Tth.

On the other hand, when the embodiment apparatus becomes unable to acquire the straight inner end line LEin at the position Pin, the embodiment apparatus executes the interpolation estimation process for acquiring the estimated inner end line LEin_est corresponding to a straight line acquired by extending the last inner end line LEin_last straight from the position Pin. The embodiment apparatus executes the interpolation estimation process for the predetermined time Tth.

The embodiment apparatus stops an execution of the interpolation estimation process when the predetermined time Tth elapses after the embodiment apparatus starts to execute the interpolation estimation process, i.e., after the embodiment apparatus becomes unable to acquire the outer or inner end line LEout or LEin.

<Setting of Predetermined Time>

Figure 5:
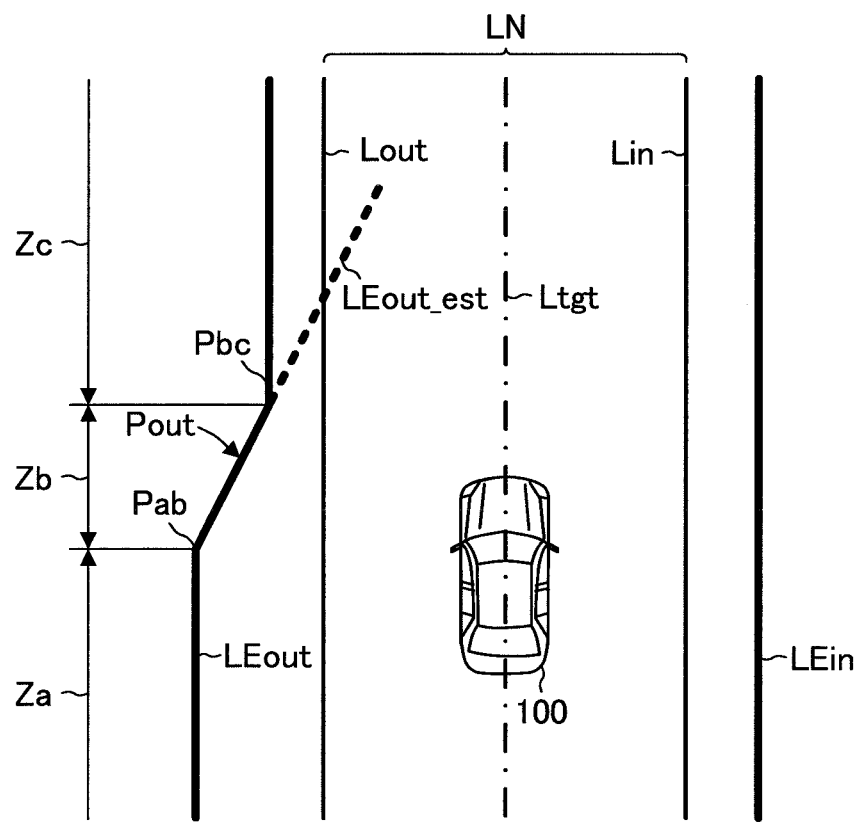
FIG. 5 is a view used for describing a situation where the road end line becomes unable to be acquired.

When the outer end line LEout changes as shown in FIG. 5, the embodiment apparatus may become unable to acquire the outer end line LEout. The outer end line LEout shown in FIG. 5 extends parallel to the outer lane marking Lout, i.e., the own vehicle traveling lane LN in a range Za before a position Pab. The outer end line LEout turns at the position Pab to extend in a direction oriented toward the outer lane marking Lout in a range Zb from the position Pab to a position Pbc. The outer end line LEout turns at the position Pbc to extend in a direction parallel to the outer lane marking Lout in a range Zc after the position Pbc.

When the outer end line LEout shown in FIG. 5 becomes unable to be acquired at the position Pout within the range Zb where the outer end line LEout extends toward the outer lane marking Lout, i.e., toward the own vehicle traveling lane LN and then, the interpolation estimation process for acquiring the estimated outer end line LEout_est is executed as described above, a line shown by a symbol LEout_est in FIG. 5 is acquired as the estimated outer end line LEout_est.

The acquired estimated outer end line LEout_est extends across the own vehicle traveling lane LN. Therefore, if it is determined whether the outer end line LDA control should be executed on the basis of the acquired estimated outer end line LEout_est, it is likely to be determined that the vehicle 100 nearly departs from the outer end line LEout. Thus, the outer end line LDA control for applying the outer end line LDA torque TQ_LDAout to the steering column 62 may be executed unnecessarily although the outer end line LDA torque TQ_LDAout does not need to be applied to the steering column 62.

Accordingly, when the embodiment apparatus becomes unable to acquire the outer end line LEout, the embodiment apparatus acquires a road end line angle θout corresponding to an angle defined by an extending direction of the outer end line LEout and an extending direction of the outer lane marking Lout (hereinafter, the road end line angle θout will be referred to as "the outer end line angle θout"). When the outer end line angle θout is smaller than a predetermined angle θth, the embodiment apparatus applies the vehicle speed V and the outer end line angle θout to a look-up table MapTbase(V,θout) to acquire a base time Tbase. The embodiment apparatus sets the acquired base time Tbase as the predetermined time Tth for which the interpolation estimation process is executed.

In this embodiment, the base time Tbase acquired by applying the large vehicle speed V to the look-up table MapTbase(V,θout), is smaller than the base time Tbase acquired by applying the small vehicle speed V to the look-up table MapTbase(V,θout). In particular, the base time Tbase acquired from the look-up table MapTbase(V,θout) decreases as the vehicle speed V increases. Further, the base time Tbase acquired by applying the large outer end line angle θout to the look-up table MapTbase(V,θout), is smaller than the base time Tbase acquired by applying the small outer end line angle θout to the look-up table MapTbase(V, θout). In particular, the base time Tbase acquired from the look-up table MapTbase(V,θout) decreases as the outer end line angle θout increases.

On the other hand, when the outer end line angle θout is larger than or equal to the predetermined angle θth, the embodiment apparatus sets the predetermined time Tth for which the interpolation estimation process is executed, to a time Tshort shorter than the base time Tbase (hereinafter the time Tshort will be referred to as "the shortened time Tshort"). In particular, the embodiment apparatus applies the base time Tbase to an expression (4) described below to acquire the shortened time Tshort and sets the shortened time Tshort as the predetermined time Tth. In the expression (4), a parameter "Kt" is a coefficient and is set to a constant value larger than zero and smaller than one (0<Kt<1).

$$Tshort=Tbase \cdot Kt \quad (4)$$

Thereby, when the outer end line angle θout is larger than or equal to the predetermined angle θth, the execution of the interpolation estimation process is stopped early after the outer end line LEout becomes unable to be acquired. Thus, an execution of a process of acquiring the estimated outer end line LEout_est is stopped early and as a result, the execution of the outer end line LDA control is stopped early. Thus, the unnecessary execution of the outer end line LDA control can be prevented.

Figure 6A:
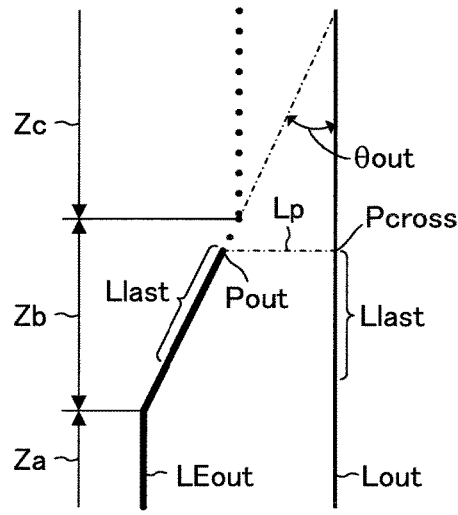
FIG. 6A is a view used for describing a road end line angle when an own vehicle traveling lane extends straight and the road end line extends straight toward the own vehicle traveling lane.

As shown in FIG. 6A, when the outer end line LEout having a predetermined length Llast immediately before the position Pout where the outer end line LEout becomes unable to be acquired, is straight and the outer lane marking Lout having the predetermined length Llast immediately before a position Pcross where a line Lp extending perpendicular to the outer lane marking Lout from the position Pout crosses the outer lane marking Lout (hereinafter, the position Pcross will be referred to as "the base position Pcross"), is straight, the outer end line angle θout is an angle defined by the extending direction of the outer end line LEout having the predetermined length Llast immediately before the position Pout and the extending direction of the outer lane marking Lout having the predetermined length Llast immediately before the position Pcross.

Figure 6B:
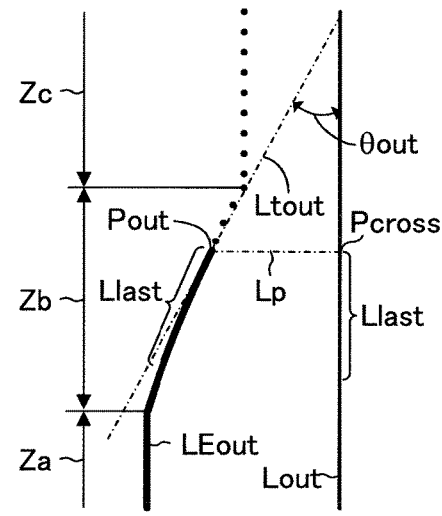
FIG. 6B is a view used for describing the road end line angle when the own vehicle traveling lane extends straight and the road end line curves toward the own vehicle traveling lane.

As shown in FIG. 6B, when the outer end line LEout having the predetermined length Llast immediately before the position Pout where the outer end line LEout becomes unable to be acquired, is curved and the outer lane marking Lout having the predetermined length Llast immediately before the base position Pcross where the line Lp extending perpendicular to the outer lane marking Lout from the position Pout crosses the outer lane marking Lout, is straight, the outer end line angle θout is an angle defined by an extending direction of a tangent line Ltout to the outer end line LEout at the position Pout and the extending direction of the outer lane marking Lout having the predetermined length Llast immediately before the base position Pcross.

Figure 6C:
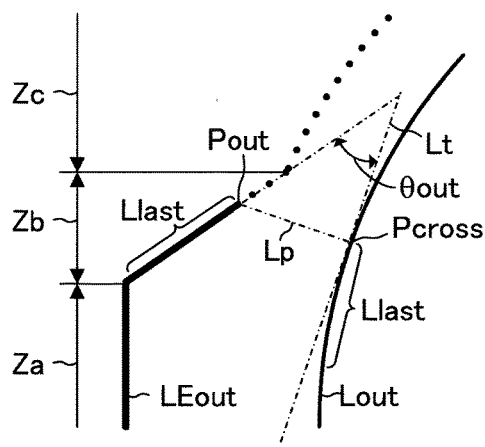
FIG. 6C is a view used for describing the road end line angle when the own vehicle traveling lane curves and the road end line extends straight toward the own vehicle traveling lane.

As shown in FIG. 6C, when the outer end line LEout having the predetermined length Llast immediately before the position Pout where the outer end line LEout becomes unable to be acquired, is straight and the outer lane marking Lout having the predetermined length Llast immediately before the base position Pcross where the line Lp extending perpendicular to the outer lane marking Lout from the position Pout crosses the outer lane marking Lout, is curved, the outer end line angle θout is an angle defined by the extending direction of the outer end line LEout having the predetermined length Llast immediately before the position Pout and an extending direction of a tangent line Lt to the outer lane marking Lout at the base position Pcross.

Figure 6D:
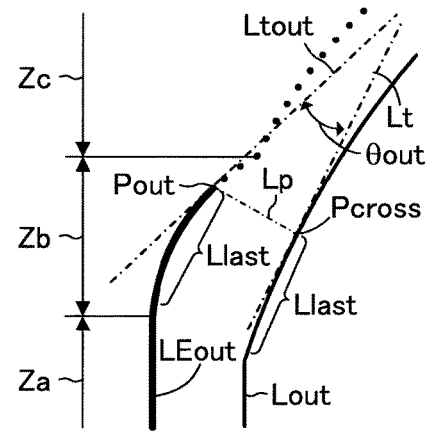
FIG. 6D is a view used for describing the road end line angle when the own vehicle traveling lane curves and the road end line curves toward the own vehicle traveling lane.

As shown in FIG. 6D, when the outer end line LEout having the predetermined length Llast immediately before the position Pout where the outer end line LEout becomes unable to be acquired, is curved and the outer lane marking Lout having the predetermined length Llast immediately before the base position Pcross where the line Lp extending perpendicular to the outer lane marking Lout from the position Pout crosses the outer lane marking Lout, is curved, the outer end line angle θout is an angle defined by the extending direction of the tangent line Ltout to the outer end line LEout at the position Pout and the extending direction of the tangent line Lt to the outer lane marking Lout at the base position Pcross.

When the outer end line LEout having the predetermined length Llast is parallel to the outer lane marking Lout, i.e., the own vehicle traveling lane LN having the predetermined length Llast, the outer end line angle θout is zero. When the outer end line LEout having the predetermined length Llast extends approaching the outer lane marking Lout having the predetermined length Llast, the outer end line angle θout is larger than zero. When the outer end line LEout having the predetermined length Llast extends away from the outer lane marking Lout having the predetermined length Llast, the outer end line angle θout is smaller than zero (i.e., a negative value).

The inner end line LEin may become unable to be acquired in a range where the inner end line LEin extends toward the inner lane marker Lin. In this case, when the interpolation estimation process for acquiring the estimated inner end line LEin_est is executed, the inner end line LDA control for applying the inner end line LDA torque TQ_LDAin to the steering column 62 may be executed unnecessarily although the inner end line LDA torque TQ_LDAin does not need to be applied to the steering column 62.

Accordingly, when the embodiment apparatus becomes unable to acquire the inner end line LEin, the embodiment apparatus acquires a road end line angle θin corresponding to an angle defined by an extending direction of the inner end line LEin and an extending direction of the inner lane marking Lin (hereinafter, the road end line angle θin will be referred to as "the inner end line angle θout"). When the inner end line angle θin is smaller than the predetermined angle θth, the embodiment apparatus applies the vehicle speed V and the inner end line angle θin to a look-up table MapTbase(V,θin) to acquire the base time Tbase. The embodiment apparatus sets the acquired base time Tbase as the predetermined time Tth for which the interpolation estimation process is executed.

In this embodiment, the base time Tbase acquired by applying the large vehicle speed V to the look-up table MapTbase(V,θin), is smaller than the base time Tbase acquired by applying the small vehicle speed V to the look-up table MapTbase(V,θin). In particular, the base time Tbase acquired from the look-up table MapTbase(V,θin) decreases as the vehicle speed V increases. Further, the base time Tbase acquired by applying the large inner end line angle θin to the look-up table MapTbase(V,θin), is smaller than the base time Tbase acquired by applying the small inner end line angle θin to the look-up table MapTbase(V,θin). In particular, the base time Tbase acquired from the look-up table MapTbase(V,θin) decreases as the inner end line angle θin increases.

On the other hand, when the inner end line angle θin is larger than or equal to the predetermined angle θth, the embodiment apparatus sets the predetermined time Tth to the shortened time Tshort acquired by applying the base time Tbase to the expression (4).

Thereby, when the inner end line angle θin is larger than or equal to the predetermined angle θth, the execution of the interpolation estimation process is stopped early after the inner end line LEin becomes unable to be acquired. Thus, an execution of a process of acquiring the estimated inner end line LEin_est is stopped early and as a result, the execution of the inner end line LDA control is stopped early. Thus, the unnecessary execution of the inner end line LDA control can be prevented.

The inner end line angle θin is acquired by a method similar to the method for acquiring the outer end line angle θout.

When the inner end line LEin having the predetermined length Llast is parallel to the inner lane marking Lin, i.e., the own vehicle traveling lane LN having the predetermined length Llast, the inner end line angle θout is zero. When the inner end line LEin having the predetermined length Llast extends approaching the inner lane marking Lin having the predetermined length Llast, the inner end line angle θin is larger than zero. When the inner end line LEin having the predetermined length Llast extends away from the inner lane marking Lin having the predetermined length Llast, the inner end line angle θin is smaller than zero (i.e., a negative value).

<Concrete Operation of Embodiment Apparatus>

Below, a concrete operation of the embodiment apparatus will be described. The CPU of the driving assist ECU 10 of the embodiment apparatus is configured or programmed to execute a routine shown by a flowchart in FIG. 7 each time a predetermined time Tcal elapses. At a predetermined timing, the CPU starts a process from a step 700 of FIG. 7 and then, executes a process of a step 720 described below. Thereafter, the CPU proceeds with the process to a step 730.

Step 720: The CPU acquires the outer and inner end lines LEout and LEin as described above.

Figure 8:
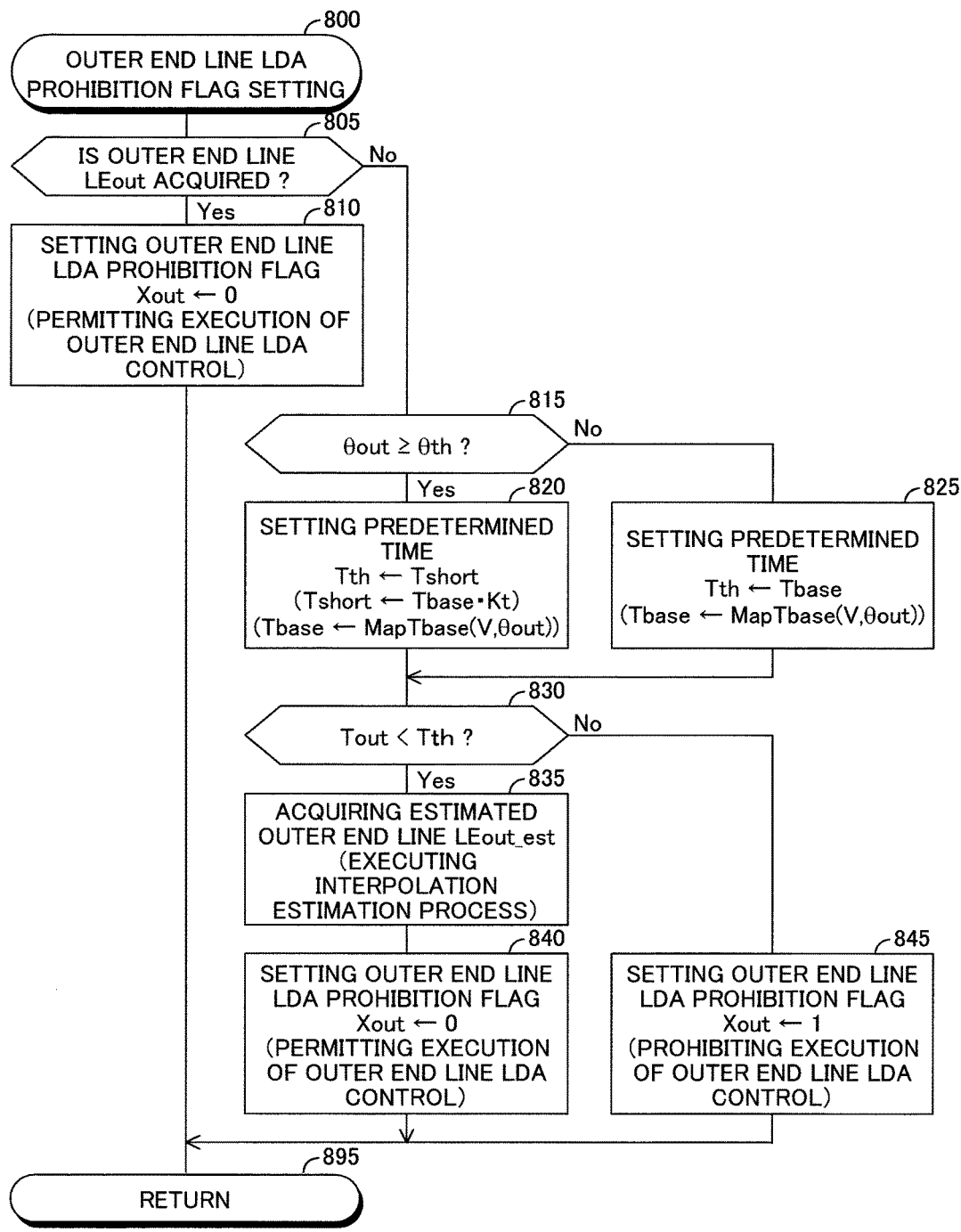
FIG. 8 is a flowchart for showing a routine executed by the CPU.

When the CPU proceeds with the process to the step 730, the CPU executes a routine shown by a flowchart in FIG. 8 to set a value of an outer end line LDA prohibition flag Xout used for prohibiting the execution of the interpolation estimation process for acquiring the estimated outer end line LEout_est.

Figure 7:
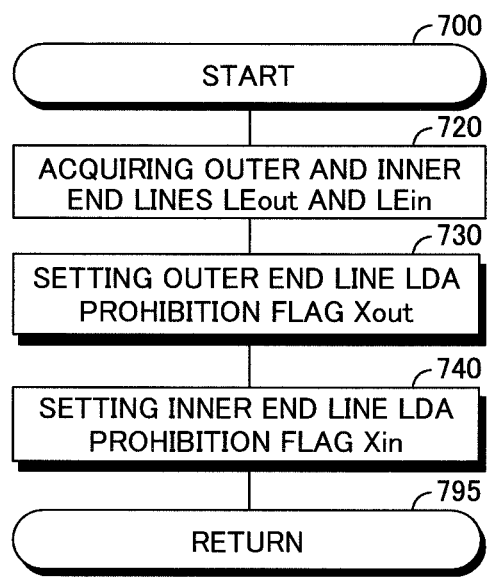
FIG. 7 is a flowchart for showing a routine executed by a CPU of a driving assist ECU shown in FIG. 1.

Therefore, when the CPU proceeds with the process to the step 730, the CPU starts a process from a step 800 of FIG. 8 and then, proceeds with the process to a step 805 to determine whether the outer end line LEout was acquired at the step 720 of FIG. 7. When the outer end line LEout was acquired, the CPU determines "Yes" at the step 805 and then, executes a process of a step 810 described below. Thereafter, the CPU proceeds with the process to a step 740 of FIG. 7 via a step 895.

Step 810: The CPU sets the value of the outer end line LDA prohibition flag Xout to "0". Thereby, the outer end line LDA control is permitted to be executed (see a step 1010 of FIG. 10 described later).

On the other hand, when the outer end line LEout was not acquired at the step 720 of FIG. 7, the CPU determines "No" at the step 805 and then, proceeds with the process to a step 815 to determine whether the outer end line angle θout is larger than or equal to the predetermined angle θth. When the outer end line angle θout is larger than or equal to the predetermined angle θth, the CPU determines "Yes" at the step 815 and then, executes a process of a step 820 described below. Thereafter, the CPU proceeds with the process to a step 830.

Step 820: The CPU sets the predetermined time Tth to the shortened time Tshort. As described above, the shortened time Tshort is acquired by multiplying the base time Tbase by the coefficient Kt and the base time Tbase is acquired by applying the vehicle speed V and the outer end line angle θout to the look-up table MapTbase(V,θout).

On the other hand, when the outer end line angle θout is smaller than the predetermined angle θth at a time of the CPU executing a process of the step 815, the CPU determines "No" at the step 815 and then, executes a process of a step 825 described below. Thereafter, the CPU proceeds with the process to the step 830.

Step 825: The CPU sets the predetermined time Tth to the base time Tbase. As described above, the base time Tbase is acquired by applying the vehicle speed V and the outer end line angle θout to the look-up table MapTbase(V,θout).

When the CPU proceeds with the process to the step 830, the CPU determines whether a time Tout elapsing from a time of determining that the outer end line LEout was not acquired at the step 805, is smaller than the predetermined time Tth. Hereinafter, the time Tout will be referred to as "the outer end line non-acquired time Tout".

When the outer end line non-acquired time Tout is smaller than the predetermined time Tth, the CPU determines "Yes" at the step 830 and then, sequentially executes processes of steps 835 and 840 described below. Thereafter, the CPU proceeds with the process to the step 740 of FIG. 7 via the step 895.

Step 835: The CPU acquires the estimated outer end line LEout_est by the interpolation estimation process as described above.

Step 840: The CPU sets the value of the outer end line LDA prohibition flag Xout to "0". Thereby, the outer end line LDA control is permitted to be executed (see the step 1010 of FIG. 10 described later).

On the other hand, when the outer end line non-acquired time Tout is larger than or equal to the predetermined time Tth at a time of the CPU executing a process of the step 830, the CPU determines "No" at the step 830 and then, executes a process of a step 845 described below. Thereafter, the CPU proceeds with the process to the step 740 of FIG. 7 via the step 895.

Step 845: The CPU sets the value of the outer end line LDA prohibition flag Xout to "1". Thereby, the outer end line LDA control is prohibited from being executed (see the step 1010 of FIG. 10 described later).

Figure 9:
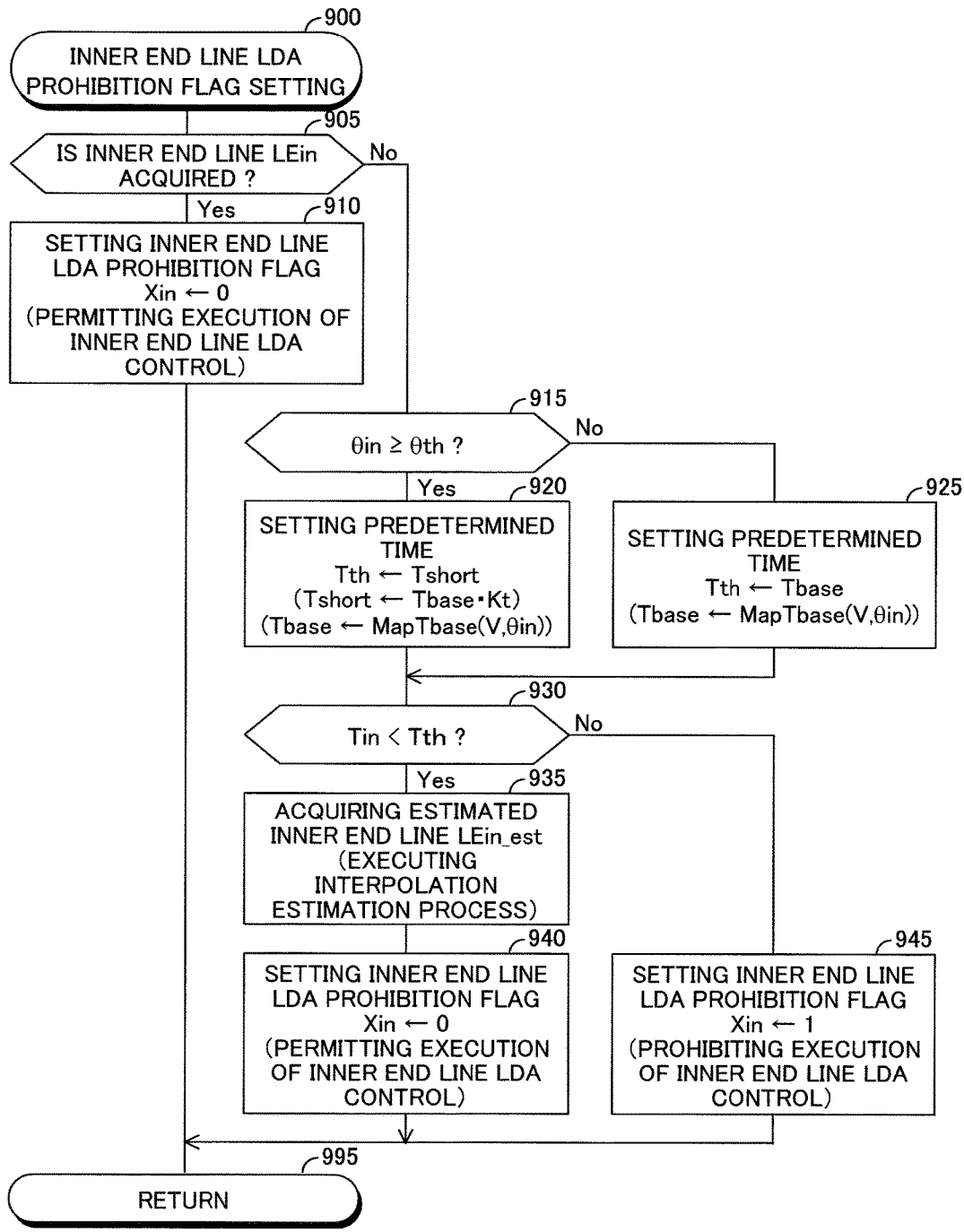
FIG. 9 is a flowchart for showing a routine executed by the CPU.

When the CPU proceeds with the process to the step 740 of FIG. 7, the CPU executes a routine shown by a flowchart in FIG. 9 to set a value of an inner end line LDA prohibition flag Xin used for prohibiting the execution of the interpolation estimation process for acquiring the estimated inner end line LEin_est.

Therefore, when the CPU proceeds with the process to the step 740, the CPU starts a process from a step 900 of FIG. 9 and then, proceeds with the process to a step 905 to determine whether the inner end line LEin was acquired at the step 720 of FIG. 7. When the inner end line LEin was acquired, the CPU determines "Yes" at the step 905 and then, executes a process of a step 910 described below. Thereafter, the CPU proceeds with the process to a step 795 of FIG. 7 via a step 995 to terminate this routine once.

Step 910: The CPU sets the value of the inner end line LDA prohibition flag Xin to "0". Thereby, the inner end line LDA control is permitted to be executed (see a step 1030 of FIG. 10 described later).

On the other hand, when the inner end line LEin was not acquired at the step 720 of FIG. 7, the CPU determines "No" at the step 905 and then, proceeds with the process to a step 915 to determine whether the inner end line angle θin is larger than or equal to the predetermined angle θth. When the inner end line angle θin is larger than or equal to the predetermined angle θth, the CPU determines "Yes" at the step 915 and then, executes a process of a step 920 described below. Thereafter, the CPU proceeds with the process to a step 930.

Step 920: The CPU sets the predetermined time Tth to the shortened time Tshort. As described above, the shortened time Tshort is acquired by multiplying the base time Tbase by the coefficient Kt and the base time Tbase is acquired by applying the vehicle speed V and the inner end line angle θin to the look-up table MapTbase(V,θin).

On the other hand, when the inner end line angle θin is smaller than the predetermined angle θth at a time of the CPU executing a process of the step 915, the CPU determines "No" at the step 915 and then, executes a process of a step 925 described below. Thereafter, the CPU proceeds with the process to the step 930.

Step 925: The CPU sets the predetermined time Tth to the base time Tbase. As described above, the base time Tbase is acquired by applying the vehicle speed V and the inner end line angle θin to the look-up table MapTbase(V,θin).

When the CPU proceeds with the process to the step 930, the CPU determines whether a time Tin elapsing from a time of determining that the inner end line LEin was not acquired at the step 905, is smaller than the predetermined time Tth. Hereinafter, the time Tin will be referred to as "the inner end line non-acquired time Tin".

When the inner end line non-acquired time Tin is smaller than the predetermined time Tth, the CPU determines "Yes" at the step 930 and then, sequentially executes processes of steps 935 and 940 described below. Thereafter, the CPU proceeds with the process to the step 795 of FIG. 7 via the step 995 to terminate this routine once.

Step 935: The CPU acquires the estimated inner end line LEin_est by the interpolation estimation process as described above.

Step 940: The CPU sets the value of the inner end line LDA prohibition flag Xin to "0". Thereby, the inner end line LDA control is permitted to be executed (see the step 1030 of FIG. 10 described later).

On the other hand, when the inner end line non-acquired time Tin is larger than or equal to the predetermined time Tth at a time of the CPU executing a process of the step 930, the CPU determines "No" at the step 930 and then, executes a process of a step 945 described below. Thereafter, the CPU proceeds with the process to the step 795 of FIG. 7 via the step 995 to terminate this routine once.

Step 945: The CPU sets the value of the inner end line LDA prohibition flag Xin to "1". Thereby, the inner end line LDA control is prohibited from being executed (see the step 1030 of FIG. 10 described later).

Figure 10:
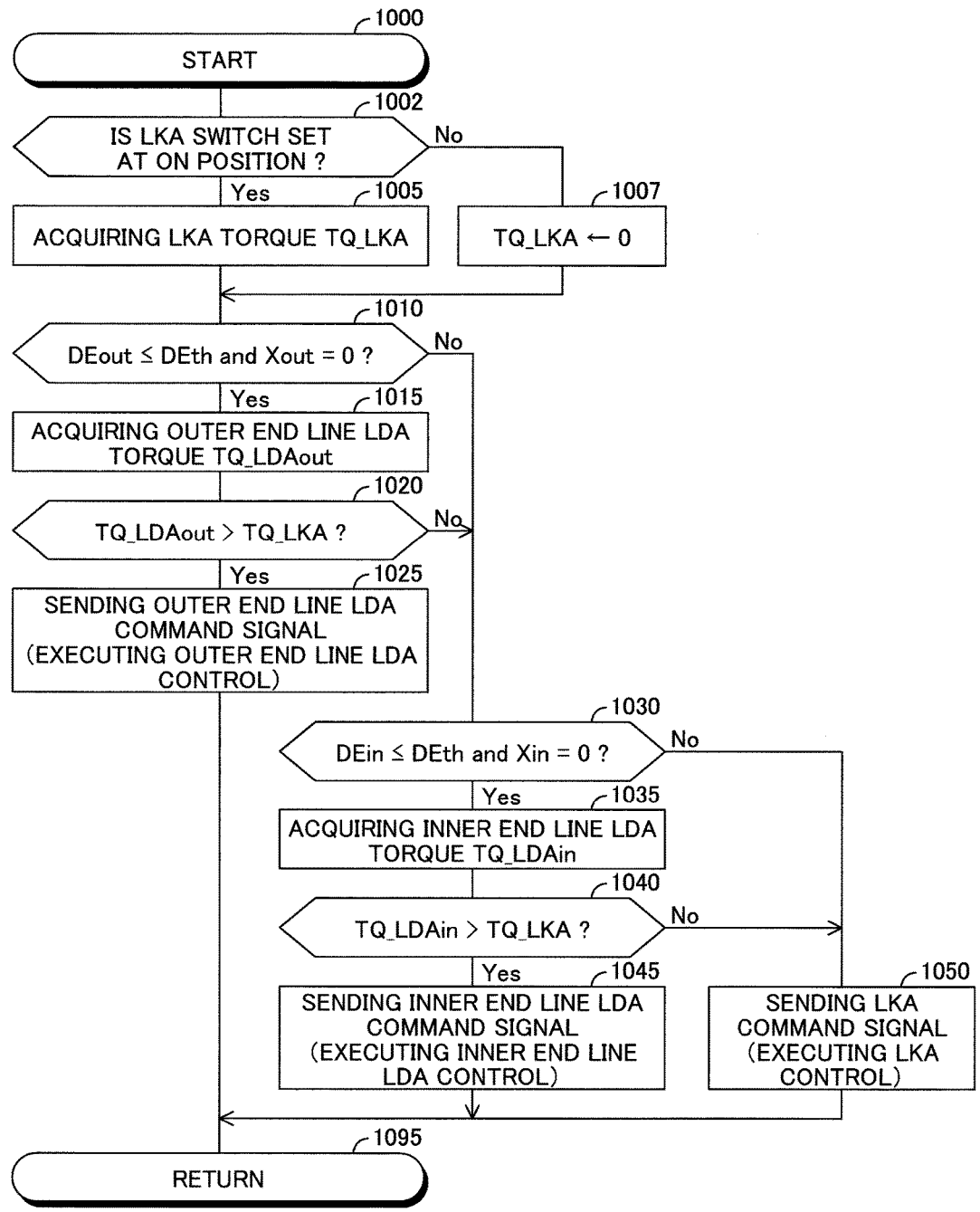
FIG. 10 is a flowchart for showing a routine executed by the CPU.

Further, the CPU of the driving assist ECU 10 is configured or programmed to execute a routine shown by a flowchart in FIG. 10 each time the predetermined time Tcal elapses. At a predetermined timing, the CPU starts a process from a step 1000 of FIG. 10 and then, proceeds with the process to a step 1002 to determine whether the LKA switch 56 is set at the ON position.

When the LKA switch 56 is set at the ON position, the CPU determines "Yes" at the step 1002 and then, executes a process of a step 1005 described below. Thereafter, the CPU proceeds with the process to a step 1010.

Step 1005: The CPU acquires the LKA torque TQ_LKA as described above.

On the other hand, when the LKA switch 56 is set at the OFF position, the CPU determines "No" at the step 1002 and then, executes a process of a step 1007 described below. Thereafter, the CPU proceeds with the process to the step 1010.

Step 1007: The CPU sets the LKA torque TQ_LKA to zero.

When the CPU proceeds with the process to the step 1010, the CPU determines whether the outer end line distance DEout is smaller than or equal to the predetermined distance DEth and the value of the outer end line LDA prohibition flag Xout is "0". When the outer end line distance DEout is smaller than or equal to the predetermined distance DEth and the value of the outer end line LDA prohibition flag Xout is "0", the CPU determines "Yes" at the step 1010 and then, executes a process of a step 1015 described below. Thereafter, the CPU proceeds with the process to a step 1020.

Step 1015: The CPU acquires the outer end line LDA torque TQ_LDAout as described above.

When the CPU proceeds with the process to the step 1020, the CPU determines whether the outer end line LDA torque TQ_LDAout is larger than the LKA torque TQ_LKA. When the outer end line LDA torque TQ_LDAout is larger than the LKA torque TQ_LKA, the CPU determines "Yes" at the step 1020 and then, executes a process of a step 1025 described below. Thereafter, the CPU proceeds with the process to a step 1095 to terminate this routine once.

Step 1025: The CPU sends the outer end line LDA command signal to the steering ECU 20. When the steering ECU 20 receives the outer end line LDA command signal, the steering ECU 20 executes the outer end line LDA control. In this case, the steering ECU 20 activates the EPS device 21 to apply the steering torque TQ corresponding to the outer end line LDA torque TQ_LDAout to the steering column 62 to prevent the vehicle 100 from departing the own vehicle traveling road RD beyond the outer end line LEout.

On the other hand, when the LKA torque TQ_LKA is larger than or equal to the outer end line LDA torque TQ_LDAout at a time of the CPU executing a process of the step 1020, the CPU determines "No" at the step 1020 and then, proceeds with the process to a step 1030.

In addition, when the outer end line distance DEout is larger than the predetermined distance DEth or the value of the outer end line LDA prohibition flag Xout is "1" at a time of the CPU executing a process of the step 1010, the CPU determines "No" at the step 1010 and then, proceeds with the process to the step 1030. It should be noted that when the outer end line distance DEout was not acquired, in other words, the estimated outer end line LEout_est was not acquired (see a determination "No" at the step 830 of FIG. 8), the CPU determines "No" at the step 1010 and then, proceeds with the process to the step 1030.

When the CPU proceeds with the process to the step 1030, the CPU determines whether the inner end line distance DEin is smaller than or equal to the predetermined distance DEth and the value of the inner end line LDA prohibition flag Xin is "0". When the inner end line distance DEin is smaller than or equal to the predetermined distance DEth and the value of the inner end line LDA prohibition flag Xin is "0", the CPU determines "Yes" at the step 1030 and then, executes a process of a step 1035 described below. Thereafter, the CPU proceeds with the process to a step 1040.

Step 1035: The CPU acquires the inner end line LDA torque TQ_LDAin as described above.

When the CPU proceeds with the process to the step 1040, the CPU determines whether the inner end line LDA torque TQ_LDAin is larger than the LKA torque TQ_LKA. When the inner end line LDA torque TQ_LDAin is larger than the LKA torque TQ_LKA, the CPU determines "Yes" at the step 1040 and then, executes a process of a step 1045 described below. Thereafter, the CPU proceeds with the process to the step 1095 to terminate this routine once.

Step 1045: The CPU sends the inner end line LDA command signal to the steering ECU 20. When the steering ECU 20 receives the inner end line LDA command signal, the steering ECU 20 executes the inner end line LDA control. In this case, the steering ECU 20 activates the EPS device 21 to apply the steering torque TQ corresponding to the inner end line LDA torque TQ_LDAin to the steering column 62 to prevent the vehicle 100 from departing from the own vehicle traveling road RD beyond the inner end line LEin.

On the other hand, when the LKA torque TQ_LKA is larger than or equal to the inner end line LDA torque TQ_LDAin at a time of the CPU executing a process of the step 1040, the CPU determines "No" at the step 1040 and then, executes a process of a step 1050 described below. Thereafter, the CPU proceeds with the process to the step 1095 to terminate this routine once.

Step 1050: The CPU sends an LKA command signal to the steering ECU 20. When the steering ECU 20 receives the LKA command signal, the CPU executes the LKA control. In this case, the steering ECU 20 activates the EPS device 21 to apply the steering torque TQ corresponding to the LKA torque TQ_LKA to the steering column 62 to cause the vehicle 100 to travel along the target traveling line Ltgt.

In addition, when the inner end line distance DEin is larger than the predetermined distance DEth or the value of the inner end line LDA prohibition flag Xin is "1" at a time of the CPU executing a process of the step 1030, the CPU determines "No" at the step 1030 and then, executes the process of the step 1050 described above. Thereafter, the CPU proceeds with the process to the step 1095 to terminate this routine once.

It should be noted that when the inner end line distance DEin was not acquired, in other words, the estimated inner end line LEin_est was not acquired (see a determination of the step 930 of FIG. 9), the CPU determines "No" at the step 1030 and then, executes the process of the step 1050 described above. Thereafter, the CPU proceeds with the process to the step 1095 to terminate this routine once.

The concrete operation of the embodiment apparatus has been described. According to the concrete operation, when the outer end line LEout becomes unable to be acquired and the outer end line LEout orients the outer lane marking Lout, i.e., the own vehicle traveling lane LN at an angle larger than or equal to the predetermined angle θth (see a determination "Yes" at the step 815 of FIG. 8), a duration time of the execution of the interpolation estimation process for acquiring the estimated outer end line LEout_est (see the step 820 of FIG. 8).

When the inner end line LEin becomes unable to be acquired and the inner end line LEin orients the inner lane marking Lin, i.e., the own vehicle traveling lane LN at an angle larger than or equal to the predetermined angle θth (see a determination "Yes" at the step 915 of FIG. 8), a duration time of the execution of the interpolation estimation process for acquiring the estimated inner end line LEin_est (see the step 920 of FIG. 9).

Therefore, the unnecessary execution of the LDA control can be prevented (see determinations "No" at the steps 1010 and 1030 of FIG. 10).

It should be noted that the present invention is not limited to the aforementioned embodiment and various modifications can be employed within the scope of the present invention.

Figure 11:
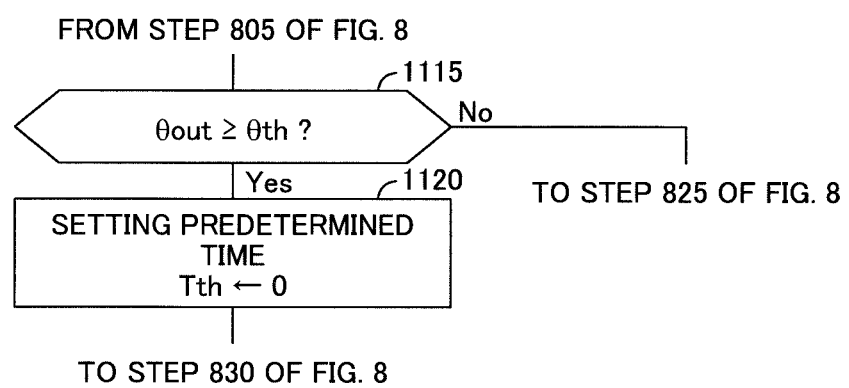
FIG. 11 is a part of a flowchart for showing a routine executed by the CPU.

For example, the embodiment apparatus may be configured to set the predetermined time Tth to zero when the outer end line angle θout is larger than or equal to the predetermined angle θth. In this case, the CPU of the driving assist ECU 10 of the embodiment apparatus executes processes of steps 1115 and 1120 of FIG. 11 in place of the processes of the steps 815 and 820 of FIG. 8. Thereby, when the CPU determines "No" at the step 805 of FIG. 8 and then, proceeds with the process to the step 1115 to determine "Yes", the CPU proceeds with the process to the step 1120 to set the predetermined time Tth to zero. Thereafter, the CPU proceeds with the process to the step 830 of FIG. 8.

Thereby, when the CPU proceeds with the process to the step 830 of FIG. 8, the CPU always determines "No" at the step 830. Thus, the interpolation estimation process for acquiring the estimated outer end line LEout_est is not executed and the outer end line LDA control is prohibited from being executed.

Figure 12:
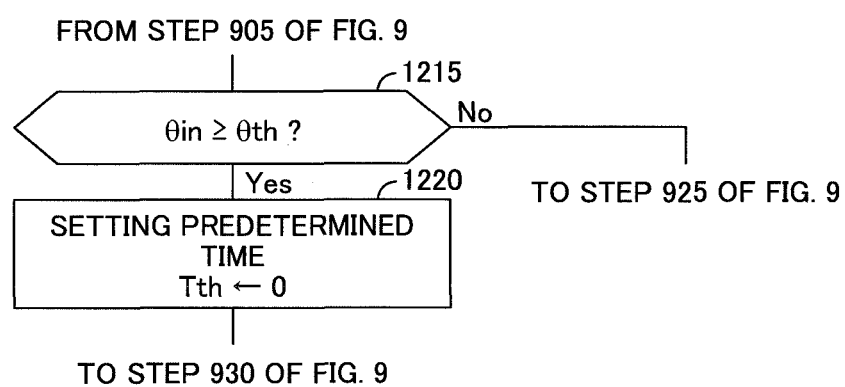
FIG. 12 is a part of a flowchart for showing a routine executed by the CPU.

Similarly, the embodiment apparatus may be configured to set the predetermined time Tth to zero when the inner end line angle θin is larger than or equal to the predetermined angle θth. In this case, the CPU of the driving assist ECU 10 of the embodiment apparatus executes processes of steps 1215 and 1220 of FIG. 12 in place of the processes of the steps 915 and 920 of FIG. 9. Thereby, when the CPU determines "No" at the step 905 of FIG. 9 and then, proceeds with the process to the step 1215 to determine "Yes", the CPU proceeds with the process to the step 1220 to set the predetermined time Tth to zero. Thereafter, the CPU proceeds with the process to the step 930 of FIG. 9.

Thereby, when the CPU proceeds with the process to the step 930 of FIG. 9, the CPU always determines "No" at the step 930. Thus, the interpolation estimation process for acquiring the estimated inner end line LEin_est is not executed and the inner end line LDA control is prohibited from being executed.

Further, the embodiment apparatus may be configured to acquire the base time Tbase on the basis of one of the vehicle speed V and the outer end line angle θout in place of acquiring the base time Tbase on the basis of the vehicle speed V and the outer end line angle θout. Otherwise, the embodiment apparatus may be configured to set the base time Tbase to a constant time, independently of the vehicle speed V and the outer end line angle θout.

Similarly, the embodiment apparatus may be configured to acquire the base time Tbase on the basis of one of the vehicle speed V and the inner end line angle θin in place of acquiring the base time Tbase on the basis of the vehicle speed V and the inner end line angle θin. Otherwise, the embodiment apparatus may be configured to set the base time Tbase to a constant time, independently of the vehicle speed V and the inner end line angle θin.

Further, the embodiment apparatus may be configured to use the coefficient Kt set, depending on at least one of the vehicle speed V and the outer end line angle θout and larger than zero and smaller than one in place of using the constant coefficient Kt in the expression (4) when the outer end line angle θout is larger than or equal to the predetermined angle θth. In this case, the coefficient Kt acquired when the vehicle speed V is large, is smaller than the coefficient Kt acquired when the vehicle speed V is small and the coefficient Kt acquired when the outer end line angle θout is large, is smaller than the coefficient Kt acquired when the outer end line angle θout is small.

Similarly, the embodiment apparatus may be configured to use the coefficient Kt set, depending on at least one of the vehicle speed V and the inner end line angle θin and larger than zero and smaller than one in place of using the constant coefficient Kt in the expression (4) when the inner end line angle θin is larger than or equal to the predetermined angle θth. In this case, the coefficient Kt acquired when the vehicle speed V is large, is smaller than the coefficient Kt acquired when the vehicle speed V is small and the coefficient Kt acquired when the inner end line angle θin is large, is smaller than the coefficient Kt acquired when the inner end line angle θin is small.

Further, the embodiment apparatus may be configured to set as the predetermined time Tth, the shortened time Tshort acquired by subtracting a time Tsub set, depending on at least one of the vehicle speed V and the outer end line angle θout or a constant time Tsub, independently of the vehicle speed V and the outer end line angle θout, from the base time Tbase when the outer end line angle θout is larger than or equal to the predetermined angle θth (Tshort=Tbase−Tsub).

Similarly, the embodiment apparatus may be configured to set as the predetermined time Tth, the shortened time Tshort acquired by subtracting a time Tsub set, depending on at least one of the vehicle speed V and the inner end line angle θin or a constant time Tsub, independently of the vehicle speed V and the inner end line angle θin, from the base time Tbase when the inner end line angle θin is larger than or equal to the predetermined angle θth (Tshort=Tbase−Tsub).

Further, the embodiment apparatus may be configured to set the predetermined time Tth, at least depending on the outer end line angle θout, independently of whether the outer end line angle θout is larger than or equal to the predetermined angle θth. In this case, the predetermined time Tth set when the outer end line angle θout is large, is smaller than the predetermined time Tth set when the outer end line angle θout is small. In particular, the predetermined time Tth is set to a value which decreases as the outer end line angle θout increases.

Similarly, the embodiment apparatus may be configured to set the predetermined time Tth, at least depending on the inner end line angle θin, independently of whether the inner end line angle θin is larger than or equal to the predetermined angle θth. In this case, the predetermined time Tth set when the inner end line angle θin is large, is smaller than the predetermined time Tth set when the inner end line angle θin is small. In particular, the predetermined time Tth is set to a value which decreases as the inner end line angle θin increases.

Thereby, when the outer or inner end line angles θout or θin is large, the execution of the interpolation estimation process is stopped early after the outer or inner end line LEout or LEin becomes unable to be acquired. As a result, the execution of the LDA control is stopped early. Thus, the unnecessary execution of the LDA control can be prevented.

Further, when the vehicle 100 includes a brake device for applying braking forces to the wheels, the embodiment apparatus may be configured to cause the brake device to apply the braking force to at least one wheel to control the traveling direction of the vehicle 100 in the LKA and LDA controls in place of or in addition to an application of the steering torque TQ from the EPS device 21 to the steering column 62.

What is claimed is:

1. A vehicle driving assist apparatus comprising:
a camera mounted on a vehicle and configured to:
  obtain an image of a landscape ahead of the vehicle, and
  acquire image data corresponding to data of the obtained image; and
an electric control unit configured to:
  acquire a road end line corresponding to a boundary between a road on which the vehicle travels and an area outside of the road by using the acquired image data,
  execute a road end line departure prevention control operation to control a traveling direction of the vehicle and prevent the vehicle from departing from the acquired road end line,
  in response to the electric control unit failing to acquire the road end line: (i) execute an interpolation estimation process to estimate the road end line as an estimated road end line based on a last road end line corresponding to a road end line acquired immediately before the electric control unit failed to acquire the road end line, (ii) execute the road end line departure prevention control operation to prevent the vehicle from departing from the estimated road end line, and (iii) refrain from executing the interpolation estimation process and the road end line departure prevention control operation upon a predetermined time elapsing after the electric control unit becomes unable to acquire the road end line, and
  in response to the last road end line extending toward a vehicle traveling lane in which the vehicle travels, (i) acquire a road end line angle defined between an extending direction of the last road end line and an extending direction of the vehicle traveling lane, and (ii) decrease the predetermined time in response to the road end line angle increasing.

2. The vehicle driving assist apparatus according to claim 1, wherein the electric control unit is configured to set the predetermined time to be smaller when the road end line angle is greater than or equal to a predetermined angle, than the predetermined time when the road end line angle is smaller than the predetermined angle.

3. The vehicle driving assist apparatus according to claim 2, wherein the electric control unit is further configured to:
  set the predetermined time to a time larger than zero in response to the road end line angle being less than the predetermined angle, and
  set the predetermined time to zero in response to the road end line angle being greater than or equal to the predetermined angle.

4. The vehicle driving assist apparatus according to claim 1, wherein the electric control unit is further configured to decrease the set predetermined time in response to a traveling speed of the vehicle increasing.

5. The vehicle driving assist apparatus according to claim 1, wherein the electric control unit is further configured to:
  execute the interpolation estimation process to acquire a straight extension line of the last road end line as the estimated road end line in response to the last road end line being straight, and
  execute the interpolation estimation process to acquire a curved extension line of the last road end line with a curvature radius of the last road end line as the estimated road end line in response to the last road end line being curved.

* * * * *